US011629297B2

(12) United States Patent
McHugh et al.

(10) Patent No.: US 11,629,297 B2
(45) Date of Patent: *Apr. 18, 2023

(54) REACTIVATED HYDROPROCESSING CATALYSTS FOR USE IN SULFUR ABATEMENT

(71) Applicant: Evonik Operations GmbH, Essen (DE)

(72) Inventors: Terence McHugh, Post Falls, ID (US); James Seamans, The Woodlands, TX (US); Brian Visioli, Houston, TX (US); Pettus Kincannon, Little Rock, AR (US); John Wesley Thompson, North Little Rock, AR (US); Alexander Enderlin, Little Rock, AR (US)

(73) Assignee: Evonik Operations GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,910

(22) Filed: Oct. 4, 2021

(65) Prior Publication Data

US 2022/0056349 A1 Feb. 24, 2022

Related U.S. Application Data

(63) Continuation of application No. 16/882,051, filed on May 22, 2020, now Pat. No. 11,136,511.

(Continued)

(51) Int. Cl.
*C10G 45/08* (2006.01)
*B01J 23/882* (2006.01)
(Continued)

(52) U.S. Cl.
CPC ............ *C10G 45/08* (2013.01); *B01J 23/882* (2013.01); *B01J 23/883* (2013.01); *B01J 23/94* (2013.01);
(Continued)

(58) Field of Classification Search
CPC .............. C10G 45/08; C10G 2300/202; C10G 2300/207; C10G 2300/4018;
(Continued)

(56) References Cited

U.S. PATENT DOCUMENTS 3,752,877 A 8/1973 Beavon
3,812,243 A * 5/1974 Landrum ................ C01B 17/05
423/574.2

(Continued)

FOREIGN PATENT DOCUMENTS

EP 0156226 10/1985
EP 0521716 1/1993

(Continued)

OTHER PUBLICATIONS

International Search Report and Written Opinion regarding corresponding PCT Application No. PCT/US2020/034353, dated Jul. 17, 2020.

(Continued)

*Primary Examiner* — Prem C Singh
*Assistant Examiner* — Brandi M Doyle
(74) *Attorney, Agent, or Firm* — Lewis & Reese, PLLC

(57) ABSTRACT

Disclosed herein are methods, systems, and compositions for providing catalysts for tail gas clean up in sulfur recovery operations. Aspects of the disclosure involve obtaining catalyst that was used in a first process, which is not a tailgas treating process and then using the so-obtained catalyst in a tailgas treating process. For example, the catalyst may originally be a hydroprocessing catalyst. A beneficial aspect of the disclosed methods and systems is that the re-use of spent hydroprocessing catalyst reduces hazardous waste generation by operators from spent catalyst disposal. Ultimately, this helps reduce the environmental impact of the catalyst life cycle. The disclosed methods and systems also (Continued)

provide an economically attractive source of high-performance catalyst for tailgas treatment, which benefits the spent catalyst generator, the catalyst provider, and the catalyst consumer.

17 Claims, 10 Drawing Sheets

Related U.S. Application Data

(60) Provisional application No. 62/852,102, filed on May 23, 2019.

(51) Int. Cl.
    *B01J 23/883* (2006.01)
    *B01J 23/94* (2006.01)
    *B01J 38/12* (2006.01)
    *B01J 38/48* (2006.01)
    *B01J 21/04* (2006.01)

(52) U.S. Cl.
    CPC ............ *B01J 38/12* (2013.01); *B01J 38/485* (2013.01); *B01J 21/04* (2013.01); *C10G 2300/202* (2013.01); *C10G 2300/207* (2013.01); *C10G 2300/4018* (2013.01); *C10G 2300/703* (2013.01)

(58) Field of Classification Search
    CPC . C10G 2300/703; B01J 23/882; B01J 23/883; B01J 23/94; B01J 38/12; B01J 38/485; B01J 21/04
    USPC .......... 208/208 R, 209; 502/34–54; 423/220, 423/213.2, 533
    See application file for complete search history.

(56) References Cited

U.S. PATENT DOCUMENTS

| | | |
|---|---|---|
| 3,947,547 A | 3/1976 | Groenendaal et al. |
| 4,026,821 A | 5/1977 | Schoofs et al. |
| 4,402,865 A | 9/1983 | Blakely |
| 5,445,728 A | 8/1995 | Sherwood, Jr. et al. |
| 5,958,816 A | 9/1999 | Neuman et al. |
| 6,015,485 A | 1/2000 | Shukis et al. |
| 6,635,596 B1 | 10/2003 | Eijsbouts et al. |
| 7,087,546 B2 | 8/2006 | Eijsbouts et al. |
| 7,686,947 B2* | 3/2010 | Cholley ............... C10G 45/08 208/213 |
| 7,696,120 B2 | 4/2010 | Ginestra et al. |
| 7,956,000 B2 | 6/2011 | Jansen et al. |
| 9,895,679 B2 | 2/2018 | Vincent et al. |
| 11,136,511 B2* | 10/2021 | McHugh ............... B01J 37/0201 |
| 2005/0159295 A1 | 7/2005 | Ginestra et al. |
| 2005/0159296 A1* | 7/2005 | Ginestra ............... B01J 38/48 502/30 |
| 2006/0234860 A1* | 10/2006 | Brignac ............... C10G 49/00 502/220 |
| 2009/0261019 A1* | 10/2009 | McCarthy ............. B01J 38/48 208/134 |
| 2016/0167039 A1* | 6/2016 | Díaz Garcia .......... B01J 38/56 502/31 |
| 2017/0036196 A1* | 2/2017 | Vincent ................ B01J 38/02 |
| 2017/0036202 A1* | 2/2017 | Vincent ................ B01J 37/28 |
| 2017/0036796 A1 | 2/2017 | Harth |
| 2018/0161767 A1 | 6/2018 | Gauthier et al. |
| 2018/0318822 A1* | 11/2018 | Bai .................... B01J 37/0203 |
| 2020/0108345 A1* | 4/2020 | Seamans ............... B01D 53/48 |
| 2020/0270533 A1 | 8/2020 | Xu et al. |
| 2020/0369968 A1* | 11/2020 | McHugh ............... B01J 35/1019 |
| 2022/0056349 A1* | 2/2022 | McHugh ............... B01J 38/485 |

FOREIGN PATENT DOCUMENTS

| | | |
|---|---|---|
| EP | 2465605 | 6/2012 |
| FR | 2699430 | 3/1995 |
| JP | 06-339635 | 12/1994 |
| WO | 96/41848 | 12/1996 |
| WO | 01/02092 | 1/2001 |
| WO | 2021/016511 A1 | 1/2021 |

OTHER PUBLICATIONS

Inamura, Kazuhiro, et al., "Preparation of Active HDS Catalysts by Controlling the Dispersion of Active Species," Applied Surface Science, 121/122, 1997, pp. 468-475.

U.S. Appl. No. 62/878,623, filed Jul. 25, 2019 entitled "Ex-Situ Treatment of a Catalyst Composition," 41 pages.

\* cited by examiner

Table 1: Physical Property Analysis of Catalyst Post Regeneration, Solvent Extraction, and Hot Nitrogen Stripping

| Catalyst Form: | | | Regenerated/Rejuvenated | | | | Solvent Extracted | Hot N2 Stripped |
|---|---|---|---|---|---|---|---|---|
| Catalyst Name | Catalyst A | Catalyst B | Catalyst C - Application 1 | Catalyst C - Application 2 | Catalyst D | Catalyst E | Catalyst F | Catalyst F |
| Average Carbon, wt% | 0.55 | 0.47 | 0.67 | 0.02 | 0.44 | 0.10 | 11.29 | 11.51 |
| Average Sulfur, wt% | 0.66 | 0.40 | 0.41 | 0.42 | 0.53 | 0.48 | 12.08 | 12.01 |
| Compacted Bulk Density, g/cc | 0.81 | 0.77 | 0.76 | 0.77 | 0.76 | 0.77 | 1.10 | 1.20 |
| Average Length, mm | 3.86 | 3.25 | 4.00 | 5.09 | 3.67 | 3.92 | 4.39 | 3.56 |
| Average Diameter, mm | 2.74 | 2.11 | 2.39 | 2.38 | 2.69 | 2.70 | 2.69 | 2.67 |
| Nitrogen Surface Area (Sulfate Corr.), m^2/g | 208.73 | 212.08 | 153.00 | 170.00 | 175.00 | 234.70 | 72.33 | 78.98 |
| APL/APD (L/D) | 0.82 | 1.19 | 1.82 | 2.82 | 1.36 | 1.45 | 1.63 | 1.33 |
| Vanadium, wt% | 0.00 | 0.01 | 0.02 | 0.01 | 0.01 | 0.01 | 0.01* | |
| Arsenic, wt% | 0.00 | 0.01 | 0.02 | 0.00 | 0.00 | 0.06 | 0.00* | |
| Sodium, wt% | 0.07 | 0.02 | 0.20 | 0.10 | 0.19 | 0.08 | 0.05* | |
| Silicon, wt% | 0.00 | 0.03 | 0.16 | 0.37 | 0.04 | 2.49 | 0.20* | |
| Iron, wt% | 0.00 | 0.06 | 0.11 | 0.03 | 0.00 | 0.09 | 0.01* | |
| Lead, wt% | 0.03 | 0.03 | 0.03 | 0.03 | 0.03 | 0.01 | 0.04* | |
| Phosphorus, wt% | 1.12 | 0.05 | 0.91 | 1.02 | 2.22 | 0.02 | 3.42* | |
| Calcium, wt% | 0.05 | 0.00 | 0.02 | 0.01 | 0.05 | 0.11 | 0.01* | |
| Molybdenum, wt% | 14.68 | 15.09 | 16.57 | 16.01 | 15.86 | 11.80 | 19.51* | |
| Nickel, wt% | 0.80 | 0.12 | 0.13 | 0.00 | 3.50 | 2.16 | 4.71* | |
| Cobalt, wt% | 3.62 | 3.44 | 3.39 | 3.54 | 0.00 | 0.01 | 0.00* | |
| Tungsten, wt% | 0.03 | 0.03 | 0.05 | 0.05 | 0.02 | 0.01 | 0.05* | |

*metals content based on a lab regenerated sample of Catalyst F

*Figure 2*

Table 2: Performance Test Results at 1,200 GHSV

| | | 1,200 GHSV Test Data | | | | | | | | | | | | |
|---|---|---|---|---|---|---|---|---|---|---|---|---|---|---|
| | | %SO2 Conversion | | | | %CS2 Conversion | | | | %COS Conversion | | | | |
| Conversion Type: | Temperature: | 300°C | 280°C | 240°C | 220°C | 300°C | 280°C | 240°C | 220°C | 300°C | 280°C | 240°C | 220°C | |
| Catalyst | Regenerated Commercial HPC Catalyst A | 99.90 | 99.97 | 99.95 | 99.65 | 100.00 | 100.00 | 95.00 | 74.16 | 97.18 | 92.82 | 87.92 | 75.00 | |
| | Excel* Rejuvenated Commercial HPC Catalyst A | 99.01 | 99.97 | 99.97 | 99.99 | 100.00 | 100.00 | 97.79 | 82.69 | 94.10 | 87.21 | 74.75 | 61.84 | |
| | Regenerated Commercial HPC Catalyst B | 99.89 | 99.90 | 99.89 | 99.58 | 100.00 | 100.00 | 100.00 | 87.43 | 97.38 | 96.76 | 93.59 | 62.60 | |
| | Excel* Rejuvenated Commercial HPC Catalyst B | 99.62 | 99.35 | 99.60 | 99.85 | 100.00 | 100.00 | 100.00 | 98.60 | 96.68 | 95.30 | 89.71 | 81.49 | |
| | Fresh Commercial HPC Catalyst C | 100.00 | 100.00 | 100.00 | 100.00 | 100.00 | 100.00 | 100.00 | 100.00 | 97.72 | 96.51 | 92.16 | 88.79 | |
| | Regenerated Commercial HPC Catalyst C - Application 1 | 99.02 | 99.03 | 99.01 | 98.96 | 100.00 | 100.00 | 100.00 | 100.00 | 100.00 | 98.87 | 97.29 | 95.77 | |
| | Regenerated Commercial HPC Catalyst C - Application 2 | 100.00 | 100.00 | 100.00 | 100.00 | 100.00 | 100.00 | 100.00 | 94.52 | 98.16 | 97.78 | 96.07 | 93.95 | |
| | Regenerated Commercial HPC Catalyst D | 100.00 | 100.00 | 100.00 | 100.00 | 100.00 | 100.00 | 100.00 | 95.05 | 100.00 | 99.67 | 98.95 | 97.33 | |
| | Excel* Rejuvenated Commercial HPC Catalyst D | 100.00 | 100.00 | 100.00 | 100.00 | 100.00 | 100.00 | 100.00 | 94.32 | 91.38 | 89.92 | 84.39 | 72.36 | |
| | Regenerated Commercial HPC Catalyst E | 99.84 | 99.65 | 96.63 | 94.51 | 95.85 | 95.08 | 96.78 | 95.51 | 96.56 | 94.80 | 89.52 | 82.23 | |
| | Solvent Extracted Commercial HPC Catalyst F | 99.94 | 96.26 | 99.15 | 98.95 | 95.98 | 95.08 | 88.03 | 80.28 | 51.72 | 44.47 | 1.44 | -46.61 | |
| | Hot Nitrogen Stripped Commercial HPC Catalyst F | | | | | 95.98 | 93.74 | 82.23 | 67.01 | 47.52 | 39.99 | -12.73 | -63.86 | |
| | Fresh Commercial Tailgas Catalyst | 99.51 | 99.50 | 98.95 | 98.35 | 97.51 | 95.52 | 87.60 | 81.16 | 96.22 | 93.90 | 84.90 | 74.98 | |

Figure 3

$$\text{Overall S Conv.} = \frac{\left[\left(\text{Feed } SO_2 \ (mol\%) * SO_2 \ \text{Conv.} \ (\%) * \frac{32 \frac{g}{mol} S}{64.07 \frac{g}{mol} SO_2}\right) + \left(\text{Feed } CS_2 \ (mol\%) * CS_2 \ \text{Conv.} \ (\%) * \frac{64 \frac{g}{mol} S_2}{76.14 \frac{g}{mol} CS_2}\right) + \left(\text{Feed } COS \ (mol\%) * COS \ \text{Conv.} \ (\%) * \frac{32 \frac{g}{mol} S}{60.075 \frac{g}{mol} COS}\right)\right]}{\left[\left(\text{Feed } SO_2 \ (mol\%) * \frac{32 \frac{g}{mol} S}{64.07 \frac{g}{mol} SO_2}\right) + \left(\text{Feed } CS_2 \ (mol\%) * \frac{64 \frac{g}{mol} S_2}{76.14 \frac{g}{mol} CS_2}\right) + \left(\text{Feed } COS \ (mol\%) * \frac{32 \frac{g}{mol} S}{60.075 \frac{g}{mol} COS}\right)\right]}$$

1,200 GHSV Test Data

| | Conversion Type: | % Overall Sulfur Conversion | | | |
|---|---|---|---|---|---|
| | Temperature: | 300°C | 280°C | 240°C | 220°C |
| Catalyst | Regenerated Commercial HPC Catalyst A | 99.49 | 98.82 | 96.73 | 89.10 |
| | Excel® Rejuvenated Commercial HPC Catalyst A | 98.47 | 97.92 | 95.34 | 89.37 |
| | Regenerated Commercial HPC Catalyst B | 99.51 | 99.42 | 98.90 | 90.48 |
| | Excel® Rejuvenated Commercial HPC Catalyst B | 99.24 | 98.86 | 98.11 | 96.56 |
| | Fresh Commercial HPC Catalyst C | 99.64 | 99.46 | 98.78 | 98.25 |
| | Regenerated Commercial HPC Catalyst C - Application 1 | 99.43 | 99.25 | 99.00 | 98.73 |
| | Regenerated Commercial HPC Catalyst C - Application 2 | 99.70 | 99.64 | 99.36 | 97.67 |
| | Regenerated Commercial HPC Catalyst D | 100.00 | 99.95 | 99.83 | 98.35 |
| | Excel® Rejuvenated Commercial HPC Catalyst D | 98.60 | 98.21 | 97.47 | 94.13 |
| | Regenerated Commercial HPC Catalyst E | 99.46 | 99.19 | 97.54 | 96.08 |
| | Solvent Extracted Commercial HPC Catalyst F | 90.99 | 89.49 | 78.93 | 67.89 |
| | Hot Nitrogen Stripped Commercial HPC Catalyst F | 90.39 | 86.45 | 76.62 | 64.30 |
| | Fresh Commercial Tailgas Catalyst | 98.44 | 97.53 | 93.66 | 90.00 |

Table 3: Overall Sulfur Conversion at 1,200 GHSV

*Figure 4*

Table 4: Performance Test Results at 3,000 GHSV

3,000 GHSV Test Data

| Conversion Type: | %SO2 Conversion | | | %CS2 Conversion | | | %COS Conversion | | |
|---|---|---|---|---|---|---|---|---|---|
| Temperature: | 280°C | 250°C | 220°C | 280°C | 250°C | 220°C | 280°C | 250°C | 220°C |
| Regenerated Commercial HPC Catalyst A | 99.82 | 99.81 | 92.63 | 98.78 | 87.29 | 39.30 | 88.90 | 69.82 | -35.31 |
| Excel® Rejuvenated Commercial HPC Catalyst A | 99.86 | 97.09 | 96.15 | 99.37 | 88.69 | 54.75 | 81.85 | 57.99 | -20.66 |
| Regenerated Commercial HPC Catalyst B | 99.84 | 97.82 | 98.06 | 100.00 | 95.39 | 58.24 | 89.88 | 75.87 | 0.81 |
| Excel® Rejuvenated Commercial HPC Catalyst B | 99.90 | 99.94 | 97.83 | 100.00 | 100.00 | 99.12 | 89.48 | 86.72 | 80.07 |
| Fresh Commercial Tailgas Catalyst | 99.33 | 97.83 | 94.88 | 78.42 | 30.86 | 9.59 | 61.21 | 30.52 | 8.86 |

3,000 GHSV Test Data

| Conversion Type: | % Overall Sulfur Conversion | | |
|---|---|---|---|
| Temperature: | 280°C | 250°C | 220°C |
| Regenerated Commercial HPC Catalyst A | 97.79 | 91.74 | 58.23 |
| Excel® Rejuvenated Commercial HPC Catalyst A | 96.83 | 88.61 | 66.62 |
| Regenerated Commercial HPC Catalyst B | 98.27 | 93.65 | 72.10 |
| Excel® Rejuvenated Commercial HPC Catalyst B | 98.24 | 97.82 | 95.30 |
| Fresh Commercial Tailgas Catalyst | 88.24 | 71.56 | 61.37 |

*Figure 5*

REACTIVATED HYDROPROCESSING CATALYSTS FOR USE IN SULFUR ABATEMENT

CROSS REFERENCE TO RELATED APPLICATIONS

This is a continuation application of U.S. patent application Ser. No. 16/882,051, filed May 22, 2020 (now U.S. Pat. No. 11,136,511), which is a non-provisional of U.S. Provisional Patent Application Ser. No. 62/852,102, filed May 23, 2019. Priority is claimed to both of these applications, and both are incorporated herein by reference.

FIELD OF THE TECHNOLOGY

The present application relates to catalysts and processes for tailgas treatment in a hydrocarbon treating process. More specifically, the application relates to reactivating a catalyst used in a hydroprocessing process and using the reactivated catalyst for tailgas treatment.

BACKGROUND

The necessity of removing sulfur from hydrocarbon streams, such as oil and natural gas derivative streams, for pollution control is well known. If sulfur is not removed from hydrocarbon compounds, then, upon combustion, sulfur dioxide and sulfur trioxide will be formed. These compounds can react with moisture in the atmosphere to form sulfuric acid, a contributor to the phenomenon known as acid rain. For this reason, in most jurisdictions, it is required by law to minimize sulfur emissions to the environment.

Sulfur is commonly removed from natural gas and other refined petroleum products by a catalytic process known as hydrodesulfurization (HDS), also commonly referred to as hydrotreating (HDT) or hydroprocessing (HDP). In this process, the hydrocarbon stream is mixed with hydrogen gas, heated, and passed over a fixed catalyst bed at elevated temperature and pressure. Commonly used catalysts for hydroprocessing comprise one or more Group VIIIB metals, such as cobalt (Co) or nickel (Ni) and one or more Group VIB metals, such as molybdenum (Mo) or tungsten (W) supported on a carrier material, such as alumina ($Al_2O_3$), silica alumina, zeolite, or combinations thereof. When a hydrotreating catalyst is used in a hydrotreating process, the activity of the catalyst decreases over time, due to the accumulation of carbon-containing deposits, referred to as coke, on the catalyst and/or by the presence of deactivating inorganic materials, such as silicon (Si), arsenic (As), and vanadium (V). Some of these catalysts may be reactivated by regeneration or rejuvenation and reused as HDS catalysts, but more often the spent catalysts are not recovered and, instead, are treated as hazardous waste. Thus, environmental and economic incentives exist for developing further uses for catalysts recovered from hydrocarbon processes such as HDS treatment.

SUMMARY

Disclosed herein is a method of treating a gas stream in a tailgas treating process, the method comprising: contacting the gas stream with a catalyst that was previously used in a hydrotreating process and that has been reactivated by a reactivation process prior to contacting the gas stream in the tailgas treating process, wherein the gas stream comprises one or more sulfur-containing species selected from the group consisting of elemental sulfur ($S_x$), sulfur dioxide ($SO_2$), carbonyl sulfide (COS), and carbon disulfide ($CS_2$), and wherein contacting the gas stream with the reactivated catalyst in the presence of hydrogen (H2) converts the one or more sulfur-containing species to hydrogen sulfide (H2S). According to some embodiments, the hydrotreating process is selected from the group consisting of petroleum hydrotreating processes, hydrodesulfurization (HDS), hydrodenitrogenation (HDN), hydrogenation, hydrodemetallization (HDM), naphtha hydrotreating (NHT), diesel hydrotreating (DHT), kerosene hydrotreating (KHT), jet fuel hydrotreating (JHT), atmospheric gas oil hydrotreating, vacuum gas oil (VGO) hydrotreating, and fluid catalytic cracker (FCC) feed hydrotreating. According to some embodiments, the catalyst comprises one or more Group VIIIB metals and one or more Group VIB metals supported on an inorganic oxide carrier material. According to some embodiments, the catalyst comprises cobalt and molybdenum supported on aluminum oxide. According to some embodiments, the catalyst comprises nickel and molybdenum supported on aluminum oxide. According to some embodiments, the reactivation process comprises regeneration. According to some embodiments, the regeneration comprises heating the catalyst in an oxygen-containing atmosphere at a temperature of 300 to 500° C. for a time of 30 minutes or more. According to some embodiments, prior to the regeneration treatment, hydrocarbons are removed from the catalyst by solvent extraction or by contacting the catalyst with steam, natural gas combustion products, hydrogen or nitrogen at a temperature of 150 to 550 ° C. According to some embodiments, the reactivation process comprises rejuvenation. According to some embodiments, the rejuvenation comprises impregnating the catalyst with a solution containing a chelating agent and drying the catalyst at a temperature of 50° C. to 300° C. According to some embodiments, the chelating agent is an organic acid. According to some embodiments, the reactivated catalyst is pre-sulfurized prior to contacting the gas stream in the tailgas treating process. According to some embodiments, the reactivated catalyst is pre-sulfided prior to contacting the gas stream in the tailgas treating process. According to some embodiments, the reactivated catalyst is resized, reshaped, and/or reformulated prior to contacting the gas stream in the tailgas treating process. According to some embodiments, the reactivated catalyst is resized by length grading the catalyst. According to some embodiments, the resizing, reshaping, and/or reformulating comprises milling the reactivated catalyst to a fine powder and then reforming the reactivated catalyst. According to some embodiments, the reactivated catalyst is resized from having a diameter of 1.3 to 2.5 mm to having a diameter of 3 to 5 mm. According to some embodiments, contacting the gas stream with the reactivated catalyst comprises combining the reactivated catalyst with a second catalyst, wherein the second catalyst provides a lower pressure drop than the reactivated catalyst. According to some embodiments, contacting the gas stream with the reactivated catalyst comprises short loading the reactivated catalyst. According to some embodiments, the reactivated catalyst exhibits a pressure drop of 0.05 to 0.20 psi/ft, when sock-loaded and tested at 100 ft/min superficial velocity in ambient air.

Also disclosed herein is a method of forming a reactivated catalyst for a tailgas treating process, the method comprising: obtaining a spent catalyst from a hydrotreating process, and reactivating the catalyst to form the reactivated catalyst, wherein the reactivated catalyst, when contacted with a gas stream comprising one or more sulfur-containing species selected from the group consisting of elemental sulfur ($S_x$), sulfur dioxide ($SO_2$), carbonyl sulfide (COS), and carbon disulfide ($CS_2$), is capable of catalyzing the conversion of the one or more sulfur-containing species to hydrogen sulfide ($H_2S$) in the presence of hydrogen ($H_2$). According to some embodiments, the hydrotreating process is selected from the group consisting of petroleum hydrotreating processes, hydrodesulfurization (HDS), hydrodenitrogenation (HDN), hydrogenation, hydrodemetallization (HDM), naphtha hydrotreating (NHT), diesel hydrotreating (DHT), kerosene hydrotreating (KHT), jet fuel hydrotreating (JHT), atmospheric gas oil hydrotreating, vacuum gas oil (VGO) hydrotreating, and fluid catalytic cracker (FCC) feed hydrotreating. According to some embodiments, the spent catalyst comprises: an inorganic oxide support material having a surface area of 20 to 600 m2/g, one or more Group VIIIB metals, and one or more Group VIB metals supported on the inorganic oxide support material. According to some embodiments, the catalyst comprises cobalt and molybdenum supported on aluminum oxide. According to some embodiments, the catalyst comprises nickel and molybdenum supported on aluminum oxide. According to some embodiments, the reactivating comprises regeneration. According to some embodiments, the regeneration comprises heating the catalyst in an oxygen-containing atmosphere at a temperature of 300 to 500° C. for a time of 30 minutes or more. According to some embodiments, prior to the regeneration, removing hydrocarbons from the catalyst by solvent extraction or by contacting the catalyst with steam, natural gas combustion products, hydrogen or nitrogen at a temperature of 150 to 550° C. According to some embodiments, the reactivating comprises rejuvenation. According to some embodiments, the rejuvenation comprises impregnating the catalyst with a solution containing a chelating agent and drying the catalyst at a temperature of 50° C. to 300° C. According to some embodiments, the chelating agent is an organic acid. According to some embodiments, the method further comprises pre-sulfurizing the reactivated catalyst. According to some embodiments, the method further comprises pre-sulfiding the reactivated catalyst. According to some embodiments, the method further comprises resizing, reshaping, and/or reformulating the reactivated catalyst. According to some embodiments, the method further comprises milling the reactivated catalyst to a fine powder and then reforming the reactivated catalyst. According to some embodiments, the spent catalyst, prior to reactivating, has a diameter of 1.3 to 2.5 mm and the reformed reactivated catalyst has a diameter of 3 to 5 mm. According to some embodiments, the spent catalyst, as used in the hydrotreating process, exhibits a pressure drop of 0.20 to 0.80 psi/ft, and wherein the method further comprises resizing, reshaping, and/or reformulating the reactivated catalyst so that the reactivated catalyst exhibits a pressure drop of 0.05 to 0.20 psi/ft, when sock-loaded and tested at 100 ft/min superficial velocity in ambient air.

BRIEF DESCRIPTION OF THE DRAWINGS

FIG. 2 is a table showing analysis of regenerated, hot nitrogen stripped, and solvent extracted catalysts.

FIG. 3 is a table showing performance of fresh, regenerated, rejuvenated, hot nitrogen stripped, and solvent extracted catalysts for tailgas treatment at 1,200 GHSV.

FIG. 4 shows an equation used to calculate overall sulfur conversion and a comparison of overall sulfur conversion using the different catalysts.

FIG. 5 is a table showing performance of regenerated and rejuvenated catalysts for tailgas treatment at 3,000 GHSV.

DETAILED DESCRIPTION

Figure 1:
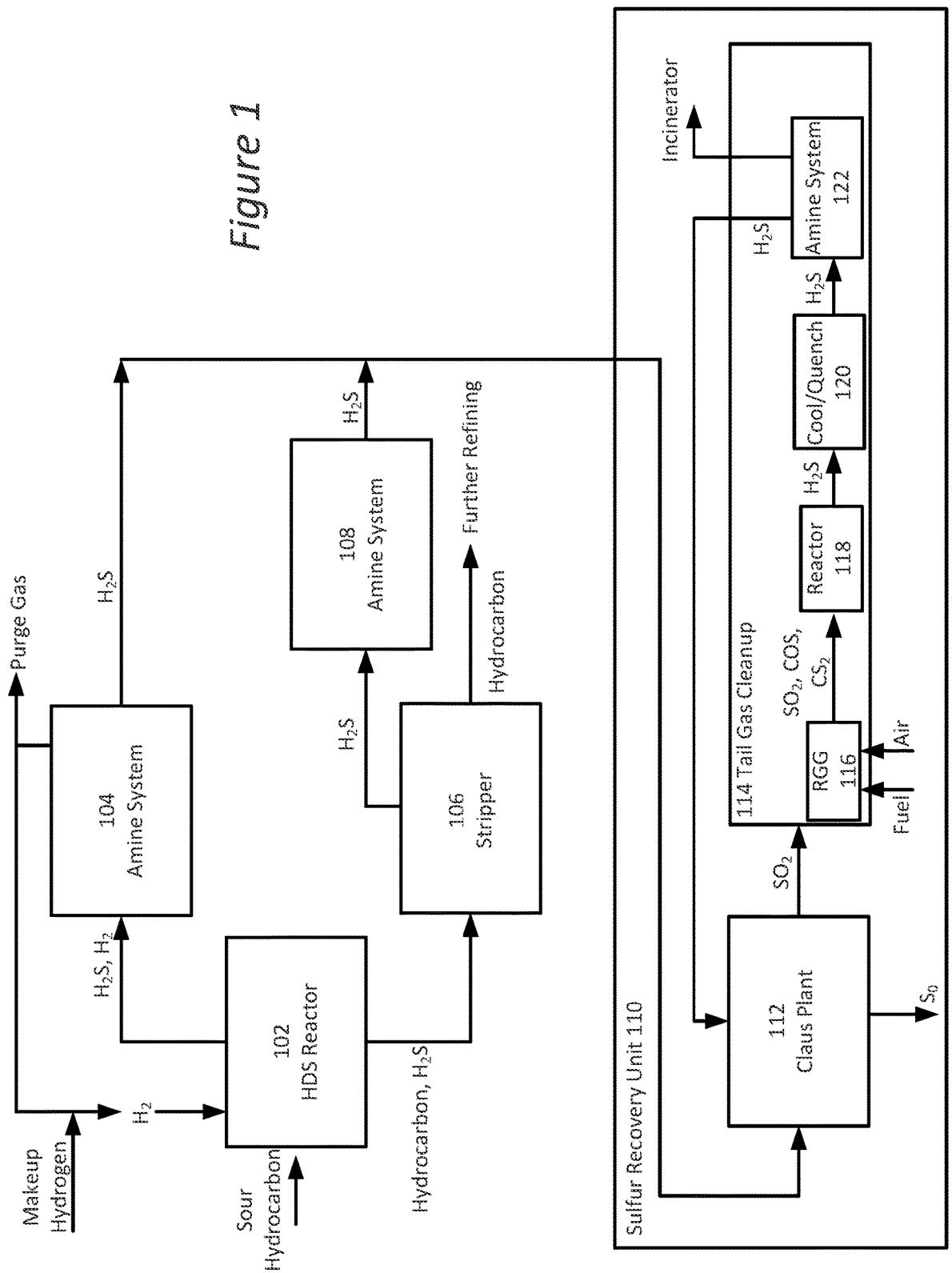
FIG. 1 shows a process for treating a sour hydrocarbon feed, wherein the process includes a hydroprocessing step and a sulfur treatment step.

FIG. 1 illustrates aspects of a hydrocarbon processing plant such as a natural gas processing facility or a petroleum refinery. As mentioned above, such facilities may include one or more hydrodesulfurization (HDS) reactors 102. A sour hydrocarbon feed (i.e., a hydrocarbon feed containing organo-sulfur compounds) is provided to the HDS reactor 102. As mentioned above, the hydrocarbon stream is heated, mixed with hydrogen gas, and passed over a catalyst at elevated temperature and pressure. As also mentioned above, catalysts for hydroprocessing typically comprise one or more Group VIIIB metals, such as cobalt (Co) or nickel (Ni) and one or more Group VIB metals, such as molybdenum (Mo) or tungsten (W) supported on a carrier material, such as alumina ($Al_2O_3$), silica alumina, zeolite, or combinations thereof. The reaction that takes place, hydrogenolysis, is characterized by cleavage of a C—S chemical bond and formation of C—H and H—S chemical bonds. In this way, the reaction of the hydrocarbon compounds (containing the embedded sulfur) with hydrogen allows liberation of the sulfur by formation of hydrogen sulfide gas ($H_2S$).

The effluent of the fixed bed reactor is cooled, and the gas and liquid are separated. The gas contains hydrogen and hydrogen sulfide, among other components. The gas is fed to an amine system 104. The amine system 104 includes an amine absorption system (not specifically illustrated) where the hydrogen sulfide is selectively absorbed into an amine absorbent. The gas is purified of hydrogen sulfide in this way and the remaining hydrogen rich gas stream is primarily recycled to be combined with fresh makeup hydrogen and fed once more to the hydrodesulfurization reactor 102. Within the amine system 104 the "rich" $H_2S$-laden amine solution is sent to an amine regenerator (not specifically illustrated). The hydrocarbon liquid from the hydrotreater effluent gas separator is routed to a stripper 106, where the hydrogen sulfide is stripped from the hydrocarbon liquid. This purifies the liquid hydrocarbon stream of hydrogen sulfide for further refining. The stripped hydrogen sulfide containing gas stream is then routed to an amine system 108 (similar to amine system 104), where the amine absorbent is used to remove the hydrogen sulfide from the rest of the gas stream. Upon regeneration of the rich hydrogen sulfide laden amine absorbent, a hydrogen sulfide rich gas stream is Obtained. Most typically, the hydrogen sulfide streams are sent to a sulfur recovery system, which may comprise a modified Claus process coupled with a tail gas cleanup process, for further processing and conversion to elemental sulfur. In some cases, though less common, the hydrogen sulfide containing streams can be converted instead to sulfuric acid in a wet sulfuric acid (WSA) plant.

Still referring to FIG. 1, the illustrated sulfur recovery system 110 includes a modified Claus process 112 that converts hydrogen sulfide to elemental sulfur. This process includes a thermal stage, typically a reaction furnace, followed by two or more catalytic stages. In the thermal stage, one-third of the hydrogen sulfide in the feed stream is combusted to yield sulfur dioxide, according to reaction 1. The sulfur dioxide reacts with hydrogen sulfide to produce elemental sulfur according to the Claus reaction, reaction 2. Thus, the overall reaction can be expressed according to reaction 3.

$H_2S + \tfrac{3}{2}O_2 \leftrightarrows SO_2 + H_2O$   Reaction 1: H$_2$S Combustion $2H_2S + SO_2 \leftrightarrows \tfrac{3}{8}S_8 + 2H_2O$   Reaction 2: Claus Reaction $3H_2S + \tfrac{3}{2}O_2 \leftrightarrows \tfrac{3}{8}S_8 + 3H_2O$   Reaction 3: Overall Reaction The hydrogen sulfide-containing feed stream(s) are combusted, and the amount of air is controlled to achieve the desired level of sulfur dioxide, as well as to convert any ammonia and hydrocarbons present. Typically, about 60-70% of the sulfur entering the modified Claus process is converted to elemental sulfur in the thermal stage. The gas from the thermal stage is then processed in each of the consecutive catalytic stages. Each catalytic stage consists of three process steps: reheat, catalytic conversion, and condensation. In the reheat step, the gas stream is heated to the desired temperature for the subsequent catalytic conversion stage. In the catalytic conversion step, additional Claus conversion according to reaction 2 is realized with a Claus catalyst, which is typically titania or alumina based. The last step is condensation of the gaseous sulfur formed in the upstream catalytic converter to liquid sulfur, which is then separated and recovered. Typically, greater than 97% sulfur recovery efficiency cannot be achieved by the modified Claus process alone. For greater sulfur recovery, for example in the 98-99.9% range, which is required in many jurisdictions, a tailgas cleanup process is required.

Thus, the illustrated sulfur recovery system 110 also includes a tailgas cleanup process 114. A common sulfur recovery tailgas cleanup system 114 includes a hydrogenation/amine treatment, which may provide 99.8+% sulfur recovery efficiency. Stringent environmental regulations, imposing mandatory low emissions and high recovery limits, have forced many sour gas processors to adopt such hydrogenation/amine-type tailgas treatment processes.

One of the most common hydrogenation/amine treatment processes is the Shell Claus Offgas Treating (SCOT) process. In the SCOT process, the sulfur dioxide and other convertible sulfur compounds in Claus tailgas are catalytically converted to hydrogen sulfide. First the Claus tailgas is heated and mixed with a reducing gas stream containing hydrogen and carbon monoxide. The reducing gas is commonly generated by a reducing gas generator (RGG) 116 operating at sub-stoichiometric combustion conditions to partially oxidize the fuel into carbon monoxide and hydrogen. The resulting gas stream obtained by mixing of the Claus tailgas and reducing gas, which contains species including sulfur dioxide (SO$_2$), carbonyl sulfide (COS), and carbon disulfide (CS$_2$), elemental sulfur (S$_x$), and carbon monoxide (CO), is then passed over a hydrogenation catalyst in a hydrogenation reactor 118. The hydrogenation catalyst most typically contains cobalt and molybdenum on an alumina support. The catalyst facilitates the hydrogenation of residual sulfur dioxide (reaction 4), hydrolysis of carbonyl sulfide (reaction 5), hydrolysis of carbon disulfide (reaction 6), and hydrogenation of elemental sulfur (reaction 7), all back to H$_2$S.

$SO_2 + 3H_2 \rightarrow H_2S + 2H_2O$   Reaction 4: SO$_2$ Reduction $COS + H_2O \rightarrow H_2S + CO_2$   Reaction 5: COS Hydrolysis $CS_2 + 2H_2O \rightarrow 2H_2S + CO_2$   Reaction 6: CS$_2$ Hydrolysis $\tfrac{1}{8}S_8 + H_2 \rightarrow H_2S$   Reaction 7: Sulfur Reduction The catalyst also facilitates a water-gas shift reaction, where carbon monoxide and water react to form hydrogen and carbon dioxide, per reaction 8.

$CO + H_2O \rightarrow H_2 + CO_2$   Reaction 8: Water-Gas Shift

The reactor effluent is typically cooled by a waste heat boiler (generating low pressure steam) followed by a water quench tower system, which both cook the gases and lowers the water content from about 30% to 5-10%. The cooled gas from the cool/quench equipment 120 is then contacted with an amine absorbent in an amine contactor column. In the amine absorption system 122, the H$_2$S in the tailgas is absorbed into the lean amine, making it rich (laden with H$_2$S) and purifying the gas stream of H$_2$S. The purified off-gas stream is then routed to an incinerator as the final treatment step before release to the atmosphere. The rich amine is routed to an amine regenerator where it is heated to drive off the H$_2$S, which is recycled back to the Claus plant for conversion to elemental sulfur. In this way, the sulfur is basically recycled to extinction. The lean, regenerated amine is fed back to the absorber for another H$_2$S pickup cycle.

It should be noted that FIG. 1 is intended to provide an overview of the SCOT process and is not intended to illustrate every piece of equipment and every variable. It should also be noted that other variants of a tailgas clean system are known in the art. For example, one variant of the original SCOT process is the Low Temperature SCOT process. In the conventional SCOT process, the tailgas stream is typically directly heated using an in-line burner (i.e., RGG 116) to about 260-300° C. before being fed to the hydrogenation reactor 118. In the low temperature SCOT process, the tailgas stream is typically indirectly heated using a high-pressure steam heater, typically to about 220-230° C. The low temperature SCOT process also requires the use of an external hydrogen source, since the reducing gas generator is no longer a part of the process scheme. Lastly, low temperature units typically use a catalyst that is specifically designed for higher activity, usually by using higher concentrations of active metals, to achieve a similar level of conversion as conventional temperature units.

Another alternative tailgas clean-up process is the Beavon Sulfur Removal (BSR) process, which also features hydrogenation of the Claus tailgas. In the BSR process, Claus tailgas is heated by an in-line burner (e.g., a reducing gas generator, RGG) at sub-stoichiometric conditions to partially oxidize the fuel to generate reducing gases. The mixture of Claus tailgas and reducing gases are fed to a hydrogenation bed packed with cobalt and molybdenum on alumina catalyst. The same reactions as listed above for the SCOT process (4-8) occur in the hydrogenation step. After the hydrogenation step, the gas is sent to a waste heat boiler, which generates low pressure steam, followed by a quench tower system, which both lowers the temperature and significantly reduces the water content. it is common to pair the BSR process with another process which aims to either recycle the H2S gas (for example BSRIMDEA) or convert the H2S gas into elemental sulfur for recovery (for example BSR/Selectox or BSRIStretford).

Notice that each of the tailgas clean-up processes described here involve a hydrogenation reactor that effects the reactions 4-7 described above. Notice also that the hydrogenation catalysts implemented in the hydrogenation reactors of the tailgas clean-up process typically comprise one or more Group VIIIB metals, such as cobalt (Co) or nickel (Ni) and one or more Group VIB metals, such as molybdenum (Mo) or tungsten (W) supported on a carrier material, such as alumina ($Al_2O_3$), silica alumina, zeolite, or combinations thereof.

Aspects of the present disclosure involve obtaining catalyst that was used in a hydrotreating process, and then using the so-obtained catalyst in a tail gas treating process. The applications from which the hydrotreating catalyst originates can include, but are not limited to, catalyst used in hydrodesulfurization (HDS) hydrodenitrogenation (HDN), hydrodemetallization (HDM), hydrodearomatization (HDA) hydrodeoxygenation (HDO), aromatic saturation, hydrocracking and other hydrogenation processes. For example, the spent catalyst may originate from the application of naphtha hydrotreating (NHT), diesel hydrotreating (DHT), kerosene hydrotreating (KHT), jet fuel hydrotreating (JHT), atmospheric gas oil hydrotreating, vacuum gas oil (VGO) hydrotreating, fluid catalytic cracker (FCC) feed hydrotreating, or any other petroleum fraction hydrotreating application. It is important to note that when referring to a hydrotreating catalyst, this term is not intended to include a catalyst that was previously used in a Claus tailgas treating process. The catalysts typically comprise one or more Group VIIIB metals, such as cobalt (Co) or nickel (Ni) and one or more Group VIB metals, such as molybdenum (Mo) or tungsten (W) supported on a carrier material, such as alumina ($Al_2O_3$), silica alumina, zeolite, or combinations thereof. These hydroprocessing catalysts can also have Type I or Type II active sites. The catalyst may also include promoters, such as boron or phosphorous promoters, among others.

As used herein, the term "reactivated catalyst" refers to a catalyst obtained from the hydrotreating process, submitted to a reactivation treatment, and then re-used in a tailgas treating process. A reactivated catalyst may be regenerated and/or rejuvenated (revitalized) catalyst.

The term "regenerated catalyst" is used herein to refer to a spent catalyst that has been submitted to in-situ or ex-situ controlled thermal treatment in the presence of oxygen to remove contaminants such as volatile hydrocarbons, carbon (coke), and sulfur. Regeneration processes are known to those skilled in the art, and although these processes may differ in configuration details, they are all aimed at removing hydrocarbons, sulfur, and carbon, converting substantially all the metals to their oxide form, and recovering as much activity as possible, all while minimizing breakage to realize the highest yield and lowest product length loss possible. Most catalyst regeneration is performed ex-situ, however in-situ regeneration can be performed, and the term regenerated as used herein is not intended to limit the scope to ex-situ regeneration only. Regeneration processes are commonly used on spent hydrotreating catalysts to recover a portion of the fresh catalyst activity from the spent catalyst. Regenerated catalysts are typically re-used in a lower severity hydrotreating unit as a lower cost alternative to fresh catalyst. Regeneration processes differ from rejuvenation (revitalization) processes in that they do not feature any process of metals re-dispersion to reverse the activity decline from metals agglomeration.

According to some embodiments, a regenerated catalyst can be prepared by obtaining a catalyst used in a hydrotreating process, as described above. The obtained catalyst can be regenerated by heating the catalyst in air to remove contaminants from the hydroprocessing process from the catalyst. For example, the catalyst may be heated within a temperature range of about 200° C. to about 600° C., more preferably 380° C. to about 500° C. for 1-24 hours, more preferably 1-3 hours. One of the key contaminants removed during the regeneration process is coke. Typically spent catalyst has a coke concentration of greater than 4 wt. %. After regeneration, the coke concentration is typically less than 4 wt. %.

The term "rejuvenated" (or revitalized) catalyst is used herein to refer to a spent catalyst that has been submitted to an in-situ or ex-situ controlled thermal treatment (regeneration) to remove volatile hydrocarbons, carbon (coke), and sulfur, followed by an ex-situ application of a chelating agent via impregnation to re-disperse active metal sites on the support that have migrated, causing metal site growth. After a specified aging period, the catalyst can be dried to the final product form. Rejuvenation processes are known to those skilled in the art, and although these processes may differ in configuration details, they are all aimed at removing hydrocarbons, sulfur, and carbon, converting substantially all of the metals to their oxide form, re-dispersing the active metal sites on the support, recovering as much activity as possible, all while minimizing breakage to realize the highest yield and lowest product length loss possible. Rejuvenation processes often recover enough activity to be close to fresh catalyst in terms of performance. In some cases, especially with regards to Type I catalysts, rejuvenation of spent catalyst can provide even higher performance than the original fresh catalyst (under hydrotreating conditions). Because of the higher degree of activity recovery compared to regenerated catalyst, a rejuvenated catalyst may be re-used in the same unit it was harvested from or one of similar severity. It does not necessarily have to be cascaded to a lower severity unit like regenerated catalyst often is.

Any rejuvenation process known in the art may be used according to the instant disclosure. According to some embodiments, a rejuvenated catalyst can be prepared by obtaining a catalyst used in a hydrotreating process, as described above. According to some embodiments, the obtained catalyst is first regenerated as described above. Following the regeneration process, the catalyst can be contacted with one or more reagents to rejuvenate the catalyst. Examples of reagents that may be used to contact the catalyst include one or more organic additives such as butanediol, pyruvic aldehyde, glycolic aldehyde, ethylene glycol, propylene glycol, glycerin, trimethylol ethane, trimethylol propane, diethylene glycol, dipropylene glycol, trimethylene glycol, triethylene glycol, tributylene glycol, tetraethylene glycol, tetrapentylene glycol, polyethers like polyethylene glycol, ethylene glycol monobutyl ether, diethylene glycol monomethyl ether, diethylene glycol monoethyl ether, diethylene glycol monopropyl ether, and diethylene glycol monobutyl ether. The catalyst may be contacted with a solution comprising the organic additive, such as a solution of the organic additive in an alcohol or an aqueous solution, for example. Alternatively, or additionally, the catalyst may be contacted with an acid such as glycolic acid, glyoxylic acid, lactic acid, diethylene triamine penta acetic acid, ethylene amine tetra acetic acid, citric acid, tartaric acid, oxalic acid, malonic acid, malic acid, or the like. Following contacting, the catalyst may be aged and/or dried. For example, the catalyst may be aged for a time ranging from hours to several days, for example, 1 hour to 24 hours, 6 to 24 hours, or for example, about 14 hours. According to some embodiments, the catalyst may be aged at room temperature. As used herein, "room temperature" refers to a temperature of about 20-25° C. According to some embodiments, a portion of the organic additive may remain in the catalyst even after drying.

Common commercial rejuvenation processes are exemplified by the following: EXCEL® (by Porocel, Houston, Tex.) described in U.S. Pat. No. 9,895,679, ENCORE® (by Criterion, Houston, Tex.) described in U.S. Pat. No. 7,696,120, REACT® (by Albemarle Corporation, Charlotte, N.C.) described in U.S. Pat. No. 7,956,000, and REFRESH® (by Haldor Topsoe, Inc., Houston, Tex.). The contents of U.S. Pat. No. 9,895,679 ("the '679 Patent") are incorporated herein by reference in their entirety.

According to some embodiments, the reactivated (i.e., regenerated or rejuvenated) catalyst can be either applied "as-is," i.e., in the original size, shape, and composition as was used in the hydrotreating process. According to other embodiments, the catalyst may be re-sized, re-shaped, reformulated, or any combination of resizing, reshaping, and reformulating, prior to use in a tailgas treating process. Resizing involves changing the size of the catalyst. This can be accomplished, for example, by length grading the catalyst, which involves selectively removing the smallest catalyst particles, effectively increasing the average particle size of the remaining catalyst. Length grading can be accomplished by sieving/screening or by other, more specialized methods known to those skilled in the art. Resizing can also be accomplished by means of milling the catalyst to a fine powder and re-forming a different sized catalyst. For example, resizing may involve milling a 1.3 mm, 1.6 mm, or 2.5 mm catalyst extrudate to a fine powder and reforming to produce a 3.0 mm or 3.5 mm catalyst extrudate. Re-shaping involves changing the shape of the catalyst. For example, re-shaping may involve milling a tri-lobe or quad-lobe catalyst extrudate to a fine powder and reforming to produce a cylindrical extrudate, spherical product, or even a ring/hollow cylinder product. Resizing and reshaping may first involve reducing the catalyst from the "as-is" form to a powder by a milling operation. The forming of the new size or shape can then be accomplished by any forming method, including but not limited to: extrusion (e.g., screw or piston extrusion), tableting, ball forming, nodulation, granulation, drop coagulation, etc.

Reformulating involves the incorporation of additional components or materials to the reactivated catalyst. For example, boehmite/pseudo-boehmite alumina or anatase titania powder may be added in a certain proportion with milled catalyst powder to produce a reformulated product. Reformulation may involve the addition of active metals, promoters, or other ingredients by physical mixing such as co-mulling, admixing, plow mixing, paddle mixing or ribbon mixing, for example. It may also involve the addition of metals, promoters, or other ingredients by precipitation or impregnation, for example. Alternatively, reformulating may involve a combination of physical mixing and impregnation to introduce additional components to the reactivated catalyst material. Any method in which additional components are added to the reactivated catalyst in any form constitutes reformulation. For example, the catalyst may be reformulated by taking the catalyst in its native form and wetting the catalyst with a solution or a slurry of active phase precursors, for example, soluble metal salts of one or more Group VIIIB metals, such as cobalt (Co) or nickel (Ni) and one or more Group VIB metals, such as molybdenum (Mo) or tungsten (W). For example, the catalyst may be re-formulated by wet impregnation with an excess of solution, dry impregnation (otherwise known as incipient wetness impregnation or pore volume impregnation), or precipitation.

Generally, a tailgas catalyst can be installed in one of three states: the oxidic state, the pre-sulfurized state, or the pre-sulfided (pre-activated) state. The oxidic state may be described as a state in which nearly all the metals are present in the metal oxide form and there is no significant amount of sulfur present on the catalyst as well as no significant amount of metal sulfides. Pre-sulfurizing may be described as a treatment in which elemental sulfur and/or sulfur containing compounds are added to the catalyst, typically with less than 60% of the metal oxides converted into metal sulfides. Pre-sulfiding (pre-activation) may be described as a treatment in which typically greater than 60% of the metal oxides are converted to metal sulfides. The advantages of pre-sulfurizing or pre-sulfiding (pre-activating) treatments (versus the oxidic state) are primarily faster and easier reactor startup after initial loading. The reactivated hydroprocessing catalysts, whether in the native or resized, reshaped, and/or reformulated state, may be submitted to a pre-sulfurizing or pre-sulfiding treatment prior to use in the target application. The disclosure and the claims set forth herein is not intended to limit the scope to any specific pre-sulfurizing or pre-sulfiding technology but is instead intended to apply to them all.

The inventors have found that, surprisingly, catalyst from a hydrotreating application may be reactivated to be fit for use in a tail-gas hydrogenation application. A beneficial aspect of the disclosed methods and systems is that the re-use of spent hydroprocessing catalyst reduces hazardous waste generation by operators from spent catalyst disposal. Ultimately, this helps reduce the environmental impact (carbon footprint) of the catalyst life cycle. The disclosed methods and systems also provide an economically attractive source of high-performance catalyst for tailgas treatment, which benefits the spent catalyst generator, the catalyst provider, and the catalyst consumer, all through beneficial reuse of an otherwise hazardous waste.

Persons of skill in the art will appreciate that some aspects of catalysts used for tailgas treatment (i.e., hydrogenation of tailgas components) may differ from aspects of catalysts used in non-tailgas treating operations (such as the hydroprocessing and other processes described above). In other words, even though the catalysts for both types of processes may use similar group metals supported on similar carrier materials, the catalysts may be optimized for one or the other types of processes. For example, a common difference between catalysts used in hydroprocessing applications and those used in tailgas treating is size. Typically, hydroprocessing catalysts are available in smaller sizes, for example, diameter sizes of 1.3 mm, 1.6 mm, or 2.5 mm extrudates are very common, while tailgas catalysts are available in larger sizes, typically with diameters from 3 to 5 mm in various shapes/forms. Another distinction between the typical hydroprocessing catalyst and the typical tailgas catalyst comes in the metals used and metals concentrations. Commercial tailgas catalysts on the market today are predominantly cobalt and molybdenum (CoMo) active metals, with typical concentration ranges of 2-3.5% Co and 6-11% Mo. Commercial hydrotreating catalysts on the market today are primarily cobalt and molybdenum (CoMo) or nickel and molybdenum (NiMo) active metals combinations. For commercial CoMo hydrotreating catalysts, typical concentration ranges are 3-4.5% Co and 12-17% Mo. For commercial NiMo hydrotreating catalysts, typical concentration ranges are 2.5-5% Ni and 9-19% Mo. Notice that the active metals content is typically much higher for hydrotreating catalysts than for tailgas catalysts. Notice also that it is not a common commercial practice, as it is in hydroprocessing service, to use Ni and/or W containing catalysts in tailgas service. Another distinction between the two catalysts is their shape. Hydroprocessing catalysts are predominantly multi-lobed extrudates whereas tail gas catalysts come in a variety of shapes, including multilobed extrudates, spherical forms, and even hollow cylinder extrudates. Another distinction between the two types of catalysts is that hydrotreating catalysts almost exclusively comprise extruded gamma/delta/theta alumina phase catalyst supports whereas tailgas catalysts comprise both spherical chi/rho/eta alumina phase catalyst supports, and extruded gamma/delta/theta alumina phase catalyst supports.

One limitation of using reactivated hydrotreating catalysts in a tailgas service is the size difference of the catalyst particles. This is perhaps one reason why, to the knowledge of the inventors, it has never been done. As already mentioned, hydroprocessing catalysts are typically of a smaller size than tailgas catalysts (1.3-2.5 mm vs. 3-5 mm, respectively). Catalysts of a smaller size cause higher packed-bed pressure drop per linear foot. There are many cases where this higher-pressure drop may be unacceptable due to the hydraulic capacity limitations it would impose on the tailgas unit. Fortunately, the inventors have identified several ways to circumvent this obstacle. One option is to length grade the catalyst. Length grading is a commercially established process which separates catalyst particles based on their size. By doing so, the smallest particles can be effectively removed which increases the average length of the remaining catalyst extrudate particles. By increasing the average particle length of the catalyst extrudates and tightening up the particle size distribution, the bed void fraction also increases. Both of these changes cause a lower pressure drop per linear foot. Within certain limits, the extent of length grading can be tailored to the desired pressure drop profile. Length grading can be accomplished by either screening/sieving, or other more specialized method. Another option is to load a shorter bed of high activity reactivated hydroprocessing catalyst than would normally be loaded for fresh tailgas catalyst in order to target both the desired pressure drop and performance profile of a standard fresh tailgas catalyst loading configuration. This is called "short-loading" and is possible because in some cases, the reactivated hydroprocessing catalysts have been shown to perform better than competitive fresh tailgas catalysts being sold in the market today. Another option is to combine a high activity and high pressure drop reactivated hydroprocessing catalyst with a lower pressure drop (larger particle size) fresh or reactivated tailgas catalyst in a layered bed configuration in order to target the desired performance and pressure drop profiles. Another option is to combine a high activity and high pressure drop reactivated hydroprocessing catalyst with a low pressure drop (larger particle size) resized, reshaped, and/or reformulated catalyst to target the desired performance and pressure drop.

Each of these options allow pressure drop limitations to be mitigated and a reactivated hydrotreating catalyst to be made suitable for application in a tailgas unit. According to some embodiments, the catalyst, as used in the original hydrotreating process would cause a pressure drop of about 0.20 psi/ft to about 0.80 psi/ft, for example about 0.40 psi/ft to about 0.60 psi/ft, when sock-loaded and tested at a superficial velocity of 100 ft/min in ambient air. After the catalyst is resized, reshaped, reformulated, short loaded, and/or combined with another lower pressure drop catalyst for tailgas treatment using one of the methods described above, the catalyst may cause a pressure drop of about 0.05 psi/ft to about 0.20 psi/ft, for example about 0.10 psi/ft to about 0.15 psi/ft, when sock-loaded and tested at a superficial velocity of 100 ft/min in ambient air.

Figure 10:
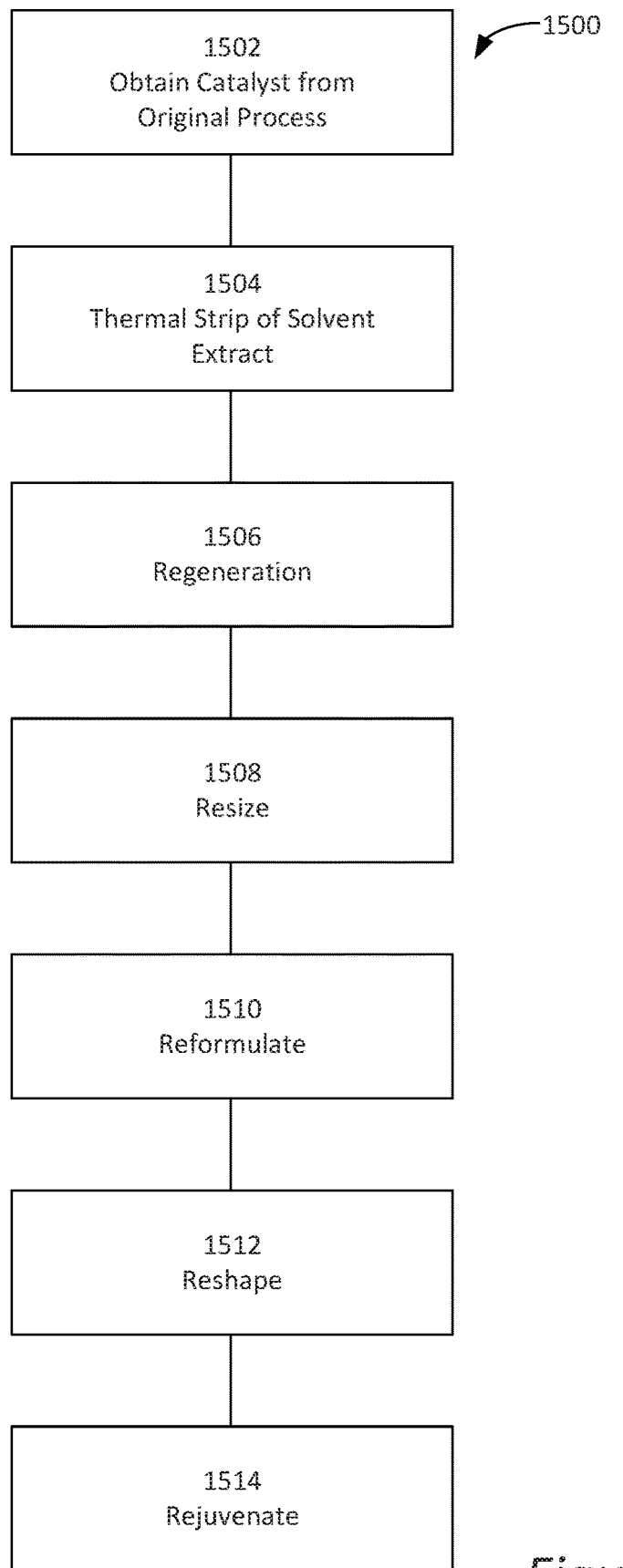
FIG. 10 shows a process for reactivating a catalyst for use in tailgas treatment.

One or more of the resizing, reshaping, and reformulating steps described above may be used to reconfigure a catalyst obtained from a first, non-tailgas treatment process to optimize the catalyst for tailgas treating. FIG. 10 illustrates an embodiment of a process 1500 for reactivating a catalyst for tailgas treating. First a catalyst is obtained from a non-tailgas treatment process 1502. The catalyst may be a tri-lobe or quad-lobe catalyst, for example, and may typically have a size of about 1.3-2.5 mm. As mentioned above, the catalyst may comprise one or more Group VIIIB metals and one or more Group VIB metals supported on a carrier material, such as alumina ($Al_2O_3$), silica alumina, zeolite, or combinations thereof.

The obtained catalyst may be thermally stripped or solvent extracted 1504, typically to remove residual hydrocarbons from the catalyst. For example, the thermal stripping process may involve contacting the catalyst with hot steam or gas, air, natural gas combustion products, hydrogen or nitrogen at a temperature from 150° C. to 550° C. For example, the solvent extraction process may involve contacting the catalyst with a non-polar solvent. The stripped or solvent extracted catalyst may be regenerated 1506, as described above. For example, the catalyst may be heated at a temperature of about 200° C. to about 600° C., more preferably 380° C. to about 500° C. for 1-24 hours, more preferably 1-3 hours. The regenerated catalyst may be resized 1508, typically by grinding or milling the regenerated catalyst to form a powder. The powder may be isolated, for example, by screening. The powder may be reformulated 1510 in one or more aspects. For example, the powder may be combined with additional carrier material, such as alumina, thereby adjusting the relative loading of the active catalyst materials (i.e., metals). The catalyst may be reshaped 1512, for example, by extruding the resized and reformulated material into a shape that is the same or different than the original catalyst shape. For example, the original catalyst may have been multi-lobed with a given number of lobes (e.g., tri-lobed or quad-lobed) and it may be reshaped to yield a cylindrical or spherical shaped catalyst. It should be noted that the catalyst may be further reformulated after reshaping. For example, the reshaped catalyst may be impregnated with further active materials (e.g., cobalt, nickel, and/or molybdenum precursor materials). The catalyst may be rejuvenated 1514. For example, the newly shaped catalyst may be exposed to one or more rejuvenation reagents and processes as described above. According to some embodiments, the catalyst is impregnated using a chelating material as described above, aged, and dried. According to some embodiments, the chelating material can include an organic additive, a portion of which remains in the catalyst material following the rejuvenation process.

It should be noted that the process 1500 is only exemplary. Some of the steps may be omitted or the steps may be conducted in a different order. For example, the catalyst obtained from the original (non-tailgas treatment) process may be regenerated and rejuvenated prior to resizing and reshaping or even be prepared without any resizing or reshaping. Other modifications to the process 1500 will be apparent to a person of skill in the art based on this disclosure.

The following examples are included to demonstrate aspects of the disclosed techniques and compositions.

EXAMPLE 1

Realistic Space Velocity (1,200 GHSV) Testing

A cylindrical vertically oriented glass reactor with an internal diameter of 3.0 cm and a height of 51 cm was filled with 70 mL of catalyst for each catalyst tested. Each of the fresh, regenerated, and Excel® rejuvenated catalyst samples (#1-10 and 13 in list below) were submitted to the same testing protocol, which consisted first of an in-situ sulfiding activation step, followed by specified performance test conditions. During the in-situ sulfiding step, a gas of the following molar composition was passed over the catalyst in down-flow fashion: 2% $H_2S$, 10% $H_2$, and 88% $N_2$. The feed gas composition was set using properly calibrated mass flow controllers for each component and verified by gas chromatography initially. The space velocity of the gas during the in-situ sulfiding step was 2,000 GHSV. The temperature was evenly ramped from 200° C. to 315° C. over a period of 16 hours. The effluent gas composition was measured every 2 hours by gas chromatography. After the 16 hours was completed, the catalyst was considered to have been fully activated by the in-situ sulfiding condition. There were two samples tested for which the in-situ sulfiding was not necessary because the active metals were already in the sulfide state, the solvent extracted, and hot nitrogen stripped samples (#11 and 12, respectively). An alternative activation startup used for pre-activated (pre-sulfided) tailgas catalysts was selected for these tests. For the alternative activation startup, a gas of the following molar composition was passed over the catalyst in down-flow fashion: 3% $H_2$, 3% CO, 9% $CO_2$, 25% $H_2O$, and 60% $N_2$. The feed gas composition was set using properly calibrated mass flow controllers for each component and verified by gas chromatography initially. The space velocity of the gas during the activation step was 500 GHSV. The temperature was evenly ramped from 200° C. to 315° C. over a period of 24 hours. The effluent gas composition was measured every 2 hours by gas chromatography. After the 24 hours was completed, the catalyst was considered to have been fully activated and ready for performance testing.

After completion of the startup in-situ sulfiding or activation, the catalyst bed was ready for the performance test conditions. During the performance test conditions, a gas of the following molar composition was passed over the catalyst in down-flow fashion: 70.05% $N_2$, 25% $H_2O$, 2.33% $H_2$, 1.20% $CO_2$, 0.59% CO, 0.47% $H_2S$, 0.23% $SO_2$, 0.060% COS, and 0.061% $CS_2$. The feed gas composition was set using properly calibrated mass flow controllers for each component and verified by gas chromatography initially. The space velocity of the gas for the performance test conditions was 1,200 GHSV, equivalent to a residence time of 3 seconds, and was intended to represent realistic commercial operating space velocity. The performance tests occurred at four distinct temperature conditions: 220° C., 240° C., 280° C., and 300° C. At each condition, the temperature was held for a time of 12 hours, more than enough time for performance to reach steady state. Compositional analysis of the reactor effluent was performed every 2 hours by gas chromatography. From the feed and average gas analysis at each performance test condition, the conversion of $SO_2$, $CS_2$, and COS were determined.

Thirteen different catalyst samples were tested according to the above-specified testing protocol. These are listed below:

1. Regenerated Commercial Hydroprocessing Catalyst A (2.5 mm trilobe)
2. Excel® Rejuvenated Commercial Hydroprocessing Catalyst A (2.5 mm trilobe)
3. Regenerated Commercial Hydroprocessing Catalyst B (2.5 mm quadlobe)
4. Excel® Rejuvenated Commercial Hydroprocessing Catalyst B (2.5 mm quadlobe)
5. Fresh Commercial Hydroprocessing Catalyst C (2.5 mm quadlobe)
6. Regenerated Commercial Hydroprocessing Catalyst C (2.5 mm quadlobe) from Application 1.
7. Regenerated Commercial Hydroprocessing Catalyst C (2.5 mm quadlobe) from Application 2.
8. Regenerated Commercial Hydroprocessing Catalyst D (2.5 mm trilobe)
9. Excel® Rejuvenated Commercial Hydroprocessing Catalyst D (2.5 mm trilobe)
10. Regenerated Commercial Hydroprocessing Catalyst E (2.5 mm trilobe)
11. Solvent Extracted Commercial Hydroprocessing Catalyst F (2.5 mm trilobe)
12. Hot Nitrogen Stripped Commercial Hydroprocessing Catalyst F (2.5 mm trilobe), and
13. Fresh Commercial Tailgas Catalyst (3.2 mm trilobe).

Catalyst A was used in diesel (ULSD) hydrotreating service prior to its reactivation. Following its use in diesel hydrotreating, Catalyst A was treated by regeneration and Excel® rejuvenation processes, as described in the above-incorporated '679 Patent. The regeneration process features, in some cases, a fluidized hot air strip to remove hydrocarbons and reduce coke content, followed by, in all cases, a high residence time, moving belt heat soak to remove carbon and sulfur embedded deep in the catalyst pores. The Excel® rejuvenation process involves first catalyst regeneration, as just described, followed by impregnation with a solution of chelating agent into the pores. The impregnated catalyst is allowed to age for a specific amount of time and then dried. The rejuvenation process helps to reverse metals agglomeration that occurs while the catalyst is in service and as a result of the regeneration process. While Porocel's regeneration and Excel® rejuvenation processes were used in these examples, regeneration and rejuvenation processes are well-known to those skilled in the art and are described, for example, in the above-referenced patents.

Catalyst B was used to process vacuum gas oil for fluid catalytic cracking feed pretreatment prior to its reactivation. Following its use in vacuum gas oil treating, Catalyst B was treated by regeneration and Excel® rejuvenation processes, as described above.

The fresh sample of commercial hydroprocessing Catalyst C was acquired in the surplus catalyst market for the purpose of performance testing.

Catalyst C from Application 1 was used in gas oil hydrotreating service prior to regeneration. Following its use in gas oil hydrotreating, Catalyst C was treated by a regeneration process, as described above.

Catalyst C from Application 2 was used in kerosene hydrotreating service prior to regeneration. Following its use in kerosene hydrotreating, Catalyst C was treated by a regeneration process, as described above.

Catalyst D was used in diesel (ULSD) hydrotreating service prior to reactivation. Following its use in diesel (ULSD) hydrotreating, Catalyst D was treated by regeneration and Excel® rejuvenation processes, as described above.

Catalyst E was used in a hydrotreating service prior to reactivation. Following its use in the hydrotreating service, Catalyst E was treated by a regeneration process.

Catalyst F was used in vacuum gas oil (VGO) pretreatment service for hydrocracking prior to recovery of the spent sample. Following its use in vacuum gas oil (VGO) pretreatment service for hydrocracking, Catalyst F was divided into two samples and submitted to two different treatments. The first treatment was a Soxhlet solvent extraction performed with toluene for 4 hours before drying for 2 hours at 110° C. The purpose of the solvent extraction was to remove residual hydrocarbons from the spent catalyst. The second treatment was a hot strip at 370° C. in a pure nitrogen sweep for 1 hour in a rotary tube calciner. The hot nitrogen strip was also intended to remove residual hydrocarbons from the spent catalyst sample.

The fresh commercial tailgas catalyst was acquired in the surplus catalyst market for the purpose of performance testing.

All the hydroprocessing catalysts tested were of the same size and shape as used for their original service and no reformulation was performed. Catalyst A, B, and C were all different catalysts made by different manufacturers and used in different hydrotreating services. Catalyst A and Catalyst D were made by the same manufacturer, were in the same service, and were even originally used in the same reactor but were different catalysts, with Catalyst A being CoMo on alumina and Catalyst D being NiMo on alumina. Catalyst C from application 1 and Catalyst C from application 2 were made by the same manufacturer and were the same type of catalyst but were sourced from different reactors after being used in different hydrotreating services and both had different contaminant profiles. Catalysts A and D-F were all made by the same manufacturer but were different catalysts, with different types of metals and metal concentrations present. Catalysts A-C were all cobalt and molybdenum (CoMo) on alumina support, whereas Catalyst D-F were nickel and molybdenum (NiMo) on alumina support. The fresh tailgas catalyst used for competitive evaluation and the fresh Catalyst C reference sample had seen no prior service and were used in the completely fresh form without alteration, just as it would be directly from the manufacturer. Select analytical data for the catalyst samples that were performance tested is shown in Table 1 (FIG. 2). The Excel® rejuvenated samples for each catalyst were from the same source material as the regenerated samples and are expected to be virtually identical with respect to the physical properties in Table 1. In the case of Catalyst F, the metals data was acquired by performing XRF analysis on a lab-scale regenerated sample, while the other analytical data were from the solvent extracted and hot nitrogen stripped samples in the state they were in before performance testing. Catalyst A and C were both phosphorous promoted CoMo on alumina catalysts, whereas Catalyst B was a non-phosphorous promoted CoMo on alumina catalyst. On the other hand, Catalyst D and F were both phosphorous promoted NiMo on alumina catalysts, whereas Catalyst E was a non-phosphorous promoted NiMo on alumina catalyst. Catalyst E was silicon promoted, whereas all other catalysts were not. Overall, the list of catalysts tested in Example 1 and FIG. 2 show that a good cross section of the hydroprocessing catalyst market was tested, from CoMo to NiMo, from phosphorous promoted to non-phosphorous promoted, from higher to lower active metals loadings, from silicon to non-silicon promoted, from fresh to regenerated and rejuvenated (as well as hot nitrogen stripped and solvent extracted), and from different catalyst types/products, manufacturers, and hydroprocessing applications.

The test results for the above described testing protocol and catalysts are listed in Table 2 (FIG. 3). Looking first at $SO_2$ conversion performance, FIG. 3 shows that out of the 36 performance data points generated at each temperature condition for the nine regenerated and rejuvenated hydroprocessing catalysts in their native form, only four performance data points fell below the fresh tailgas competitive reference catalyst. The fact that 32 out of the 36 performance data points indicated superior performance (an outperformance rate of almost 90%) provides strong evidence that the reactivated hydroprocessing catalysts can be fit for use in Claus tailgas hydrogenation service. Overall, conversion was very high (>98%) for all the regenerated and rejuvenated hydroprocessing catalysts in their native form that were tested. High $SO_2$ conversion was also achieved for the solvent extracted and hot nitrogen stripped versions of Catalyst F, with only three out of eight performance data points falling below the fresh tailgas competitive reference catalyst. From a practical standpoint, since hydrogenation of $SO_2$ proceeds much more readily than the hydrolysis of COS and $CS_2$ and, in many cases, closely approaches 100%, it is often more useful to compare the performance for hydrolysis of COS and $CS_2$ between the different catalysts for better resolution and differentiation of performance.

Looking next at $CS_2$ conversion performance, FIG. 3 shows that out of the 36 performance data points generated at each condition for the nine regenerated and rejuvenated hydroprocessing catalysts in their native form, only one performance data point fell below the fresh tailgas competitive reference catalyst. The fact that 35 out of the 36 performance data points indicated superior performance (an outperformance rate of 97%) provides compelling evidence that the reactivated hydroprocessing catalysts can be fit for the use of $CS_2$ hydrolysis in Claus tailgas hydrogenation service. One observation worth noting is that the outperformance of all the hydroprocessing catalysts tested when compared to the fresh tailgas competitive reference catalyst was much more pronounced at the 240° C., 280° C., and 300° C. temperature conditions. It is only at the 220° C. condition that there is a significant (>10%) drop in performance for three out of the nine regenerated and rejuvenated hydroprocessing catalysts in their native form. Still, even with this significant drop in performance at 220° C., all but one of the hydroprocessing catalysts still displayed higher $CS_2$ conversion activity. The hot nitrogen stripped and solvent extracted versions of Catalyst F generally underperformed the fresh tailgas competitive reference catalyst, with seven out of the eight performance data points falling below the fresh tailgas competitive reference catalyst. It is worth noting that the solvent extracted version of Catalyst F displayed nearly equal but slightly lower performance than the fresh tailgas competitive reference, whereas the hot nitrogen stripped version of Catalyst F displayed a widening margin of underperformance as temperature decreased.

Looking next at COS conversion performance, FIG. 3 shows that out of the 36 performance data points generated at each condition for the nine regenerated and rejuvenated hydroprocessing catalysts in their native form, ten performance data points fell below the fresh tailgas competitive reference catalyst. With 26 out of the 36 performance data points indicating superior performance (an outperformance rate of 72%), evidence is provided that these reactivated hydroprocessing catalysts can be fit for the use of COS hydrolysis in Claus tailgas hydrogenation service. It is worth noting that eight out of the ten data points that fell below the fresh tailgas competitive reference catalyst were for two of the three Excel® rejuvenated catalysts tested. In general, it was observed that Excel® rejuvenated catalysts showed lower COS conversion performance than their regenerated counterparts, a surprising finding. Even so, the Excel® rejuvenated catalysts still displayed quite high levels of COS conversion and did not significantly underperform the fresh competitive tailgas reference. Considering only the regenerated hydroprocessing catalysts in their native form, the outperformance rate increases to 22 out of 24, or 92%. Although the data also indicate that in general, rejuvenation did not contribute to higher COS conversion performance, it did contribute to higher CS2 conversion performance. Overall the data indicate that both regenerated and rejuvenated hydroprocessing catalysts in their native form can provide excellent COS conversion performance relative to the fresh tailgas competitive reference catalyst. The solvent extracted and hot nitrogen stripped versions of Catalyst F significantly underperformed the fresh tailgas competitive reference catalyst. In fact, both displayed half or less of the COS conversion observed for the fresh commercial tailgas reference catalyst at the highest temperature (300° C.) and conversion actually inflected to negative values, or net COS generation, at the lowest temperature (220° C.), indicating these catalysts are highly unsuitable for COS conversion.

As can be seen from FIG. 3, the regenerated and rejuvenated hydroprocessing catalysts in their native form compare quite favorably with the fresh tailgas competitive reference catalyst. To provide a more comprehensive picture of how the performance affects the sulfur recovery efficiency (SRE) impact by the catalyst, a combined metric for overall conversion of the sulfur in $SO_2$, $CS_2$, and COS was calculated. The equation used to calculate this metric is reproduced in FIG. 4, which also provides a comparison (Table 3) of the overall sulfur conversion obtained using the thirteen catalysts. All nine of the regenerated and rejuvenated hydroprocessing catalysts in their native form outperformed the fresh tailgas competitive reference catalyst at 240° C. and above. At the low temperature, 220° C., six of the regenerated and rejuvenated catalysts significantly outperformed the fresh tailgas competitive reference catalyst, while three were within 1%, a trivial difference. Therefore, practically speaking, the regenerated and rejuvenated hydroprocessing catalysts in their native form performed as well or better than the fresh commercial tailgas reference catalyst. Overall, this comprehensive view of sulfur conversion performance indicates that regenerated and rejuvenated hydroprocessing catalysts, if applied correctly, can offer an excellent alternative to very well-established tailgas catalyst products in the market such as the fresh tailgas competitive reference catalyst tested. The solvent extracted and hot nitrogen stripped versions of Catalyst F both significantly underperformed the fresh tailgas competitive reference catalyst. The poor performance results for the solvent extraction and hot nitrogen stripped versions of Catalyst F can be explained by the fact that the coke deactivation of the spent catalyst is not eliminated by these treatments as it is with thermal oxidative regeneration. Regeneration treatment is necessary to substantially remove the coke present on the catalyst and enable a high performing catalyst for this application.

EXAMPLE 2

"Stress Testing" at High Space Velocity (3,000 GHSV).

The performance of catalysts 1-4 and 13 described in Example 1 were tested using the same experimental set-up but under high space velocity conditions. The space velocity of the gas for the performance test conditions was 3,000 GHSV, equivalent to a residence time of 1.2 seconds, and was intended to represent a "stress test" to further differentiate relative catalyst performance vs. the 1,200 GHSV testing. The performance tests occurred at three distinct temperature conditions: 220° C., 250° C., and 280° C. At each condition, the temperature was held for a time of 12 hours. Compositional analysis of the reactor effluent was performed every 2 hours by gas chromatography. From the feed and effluent gas analysis at each performance test condition, the conversion of $SO_2$, $CS_2$, and COS were determined. Table 4 (FIG. 5) and FIGS. 6-9 show the results of the testing at 3,000 GHSV.

Figure 6:
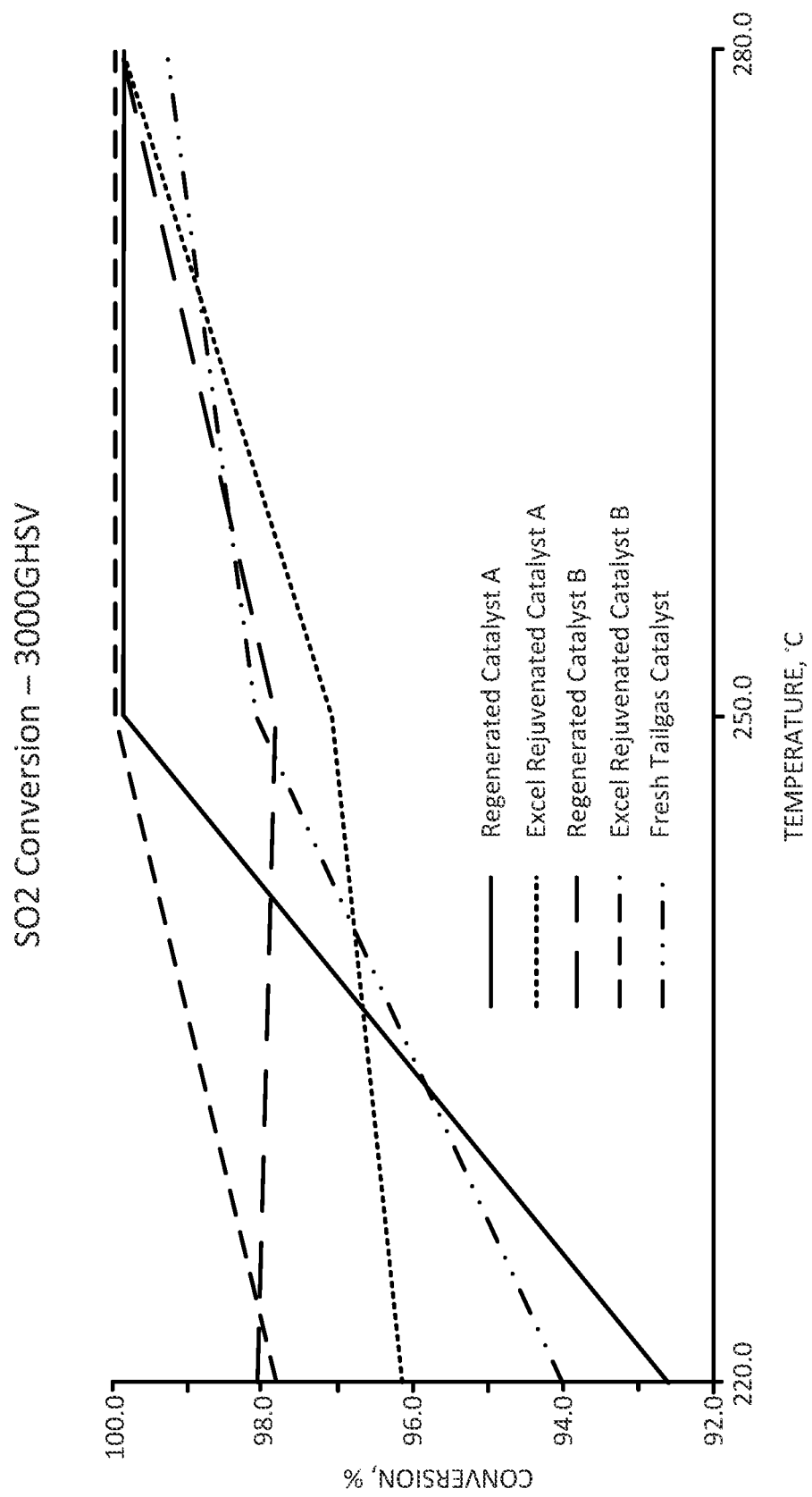
FIG. 6 shows a comparison of sulfur dioxide conversion at 3000 GHSV using different catalysts.

FIG. 6 shows SO2 conversion performance at 3000 GHSV using the five catalysts. Out of the twelve performance data points generated at each condition for the four regenerated and rejuvenated hydroprocessing catalysts, only three performance data points fell below the fresh tailgas competitive reference catalyst, with two of the three underperforming by less than 1%. The fact that nine out of the twelve performance data points indicated superior performance shows that the hydroprocessing catalysts can be fit for the use of $SO_2$ hydrogenation in Claus tailgas hydrogenation service. Overall, conversion was still very high (>97%) for all samples tested, above 220° C. At 220° C., three out of the four hydroprocessing catalysts showed higher performance than the fresh tailgas competitive reference.

Figure 7:
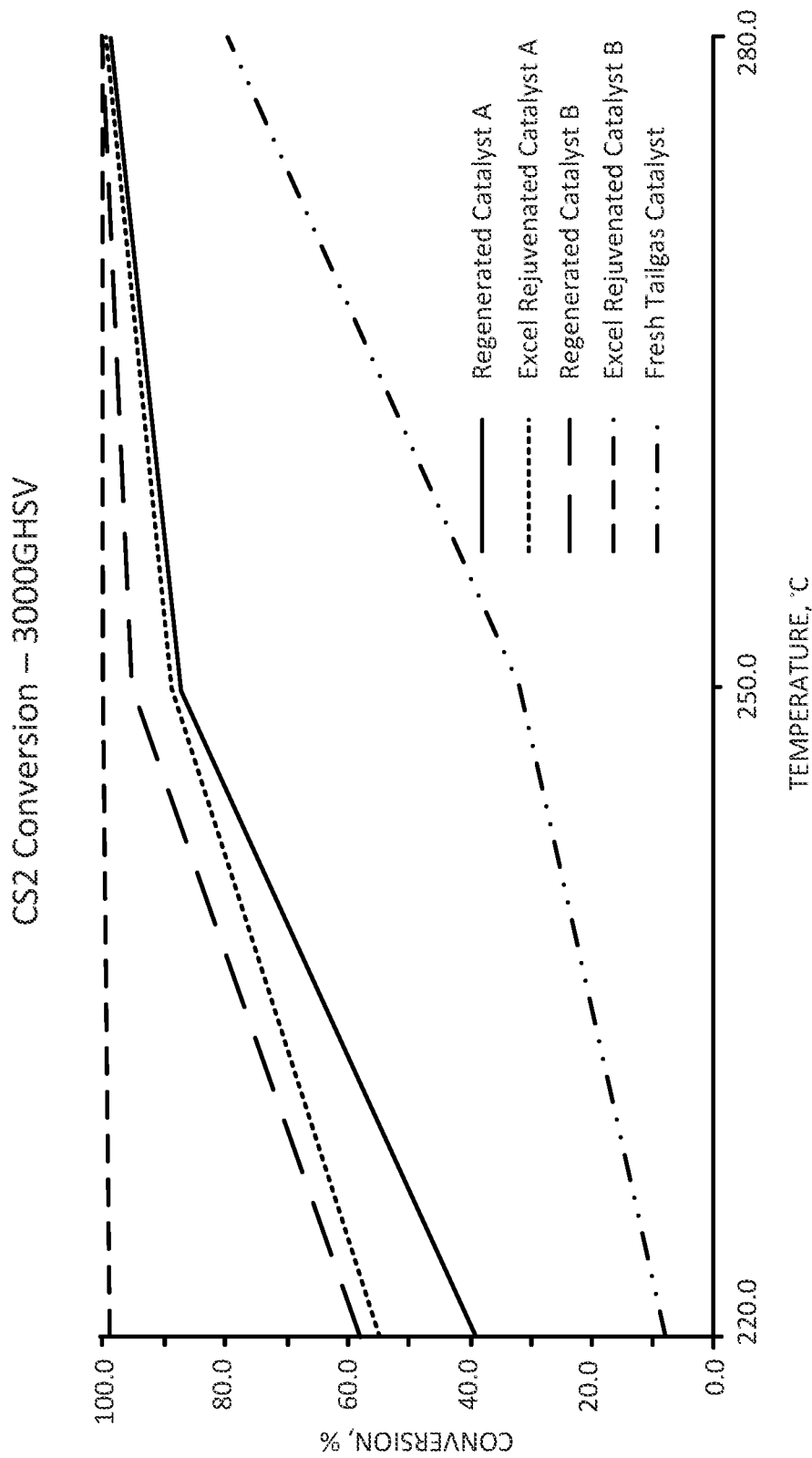
FIG. 7 shows a comparison of carbon disulfide conversion at 3000 GHSV using different catalysts.

FIG. 7 shows $CS_2$ conversion performance at 3000 GHSV using the five catalysts. Out of the twelve performance data points generated at each condition for the five regenerated and rejuvenated hydroprocessing catalysts, all of them indicated superior performance compared to fresh tailgas competitive reference catalyst. The fact that all twelve of data points indicated superior performance shows that the hydroprocessing catalysts can be fit for the use of $CS_2$ hydrolysis in Claus tailgas hydrogenation service. Not only did the hydroprocessing catalysts tested outperform, they did so by a wide margin (>20%) across the board, a very surprising finding. As with the testing at 1,200 GHSV outlined in Example 1, it is important to note that these results also suggest that the rejuvenation process enhances activity for $CS_2$ hydrolysis.

Figure 8:
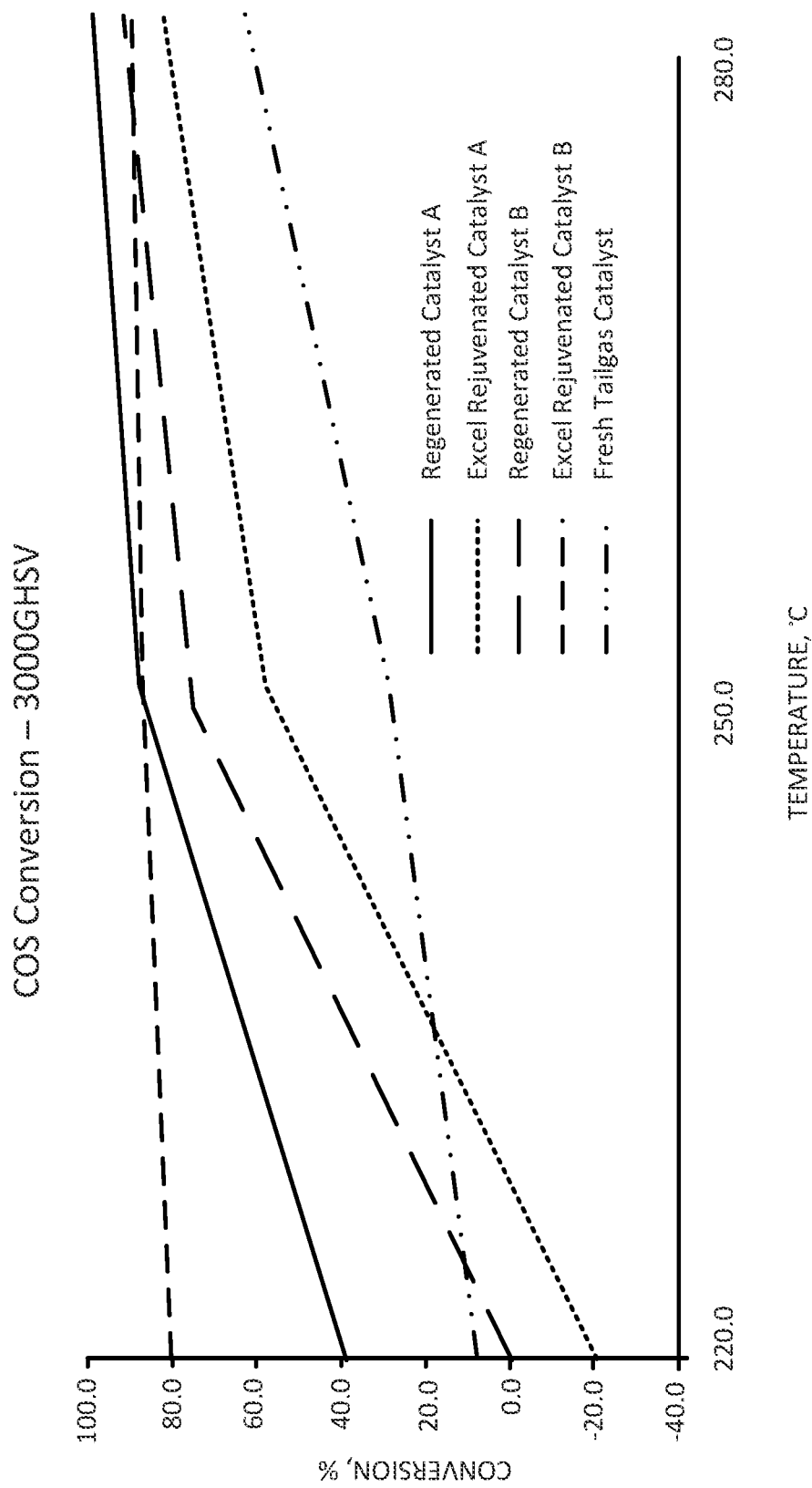
FIG. 8 shows a comparison of carbonyl sulfide conversion at 3000 GHSV using different catalysts.

FIG. 8 shows COS conversion performance at 3000 GHSV using the five catalysts. Out of the twelve performance data points generated at each condition for the four regenerated and rejuvenated hydroprocessing catalysts, only two performance data points fell below those of the fresh tailgas competitive reference catalyst. With ten out of the twelve performance data points indicating superior performance, it is clear that the hydroprocessing catalysts can be fit for the use of COS hydrolysis in Claus tailgas hydrogenation service. It is worth noting that at 250° C. and above, the hydroprocessing catalyst samples tested outperformed the fresh tailgas competitive reference catalyst by about 20%. Only at the 220° C. condition did the COS conversion for two of the four hydroprocessing catalysts drop below that of the fresh tailgas competitive reference catalyst. For overall tailgas hydrogenation performance, the data indicate that both regenerated and rejuvenated forms can provide good performance compared to the fresh tailgas competitive reference catalyst. One interesting feature to note was that the Excel® Rejuvenated Catalyst A sample displayed a negative conversion, or net formation, of COS at 220° C. This is likely because the COS hydrolysis pathway is kinetically limited for this catalyst, thus not allowing approach to the calculated equilibrium conversion and meaning that COS can be formed faster than it is consumed by reaction. This is also indicated by the fact that conversion was about 62% at 220° C. and 1,200 GHSV (see Example 1) but at the higher space velocity (3000 GHSV) in this example, the conversion decreased to −20%, or a net formation of 20%.

Figure 9:
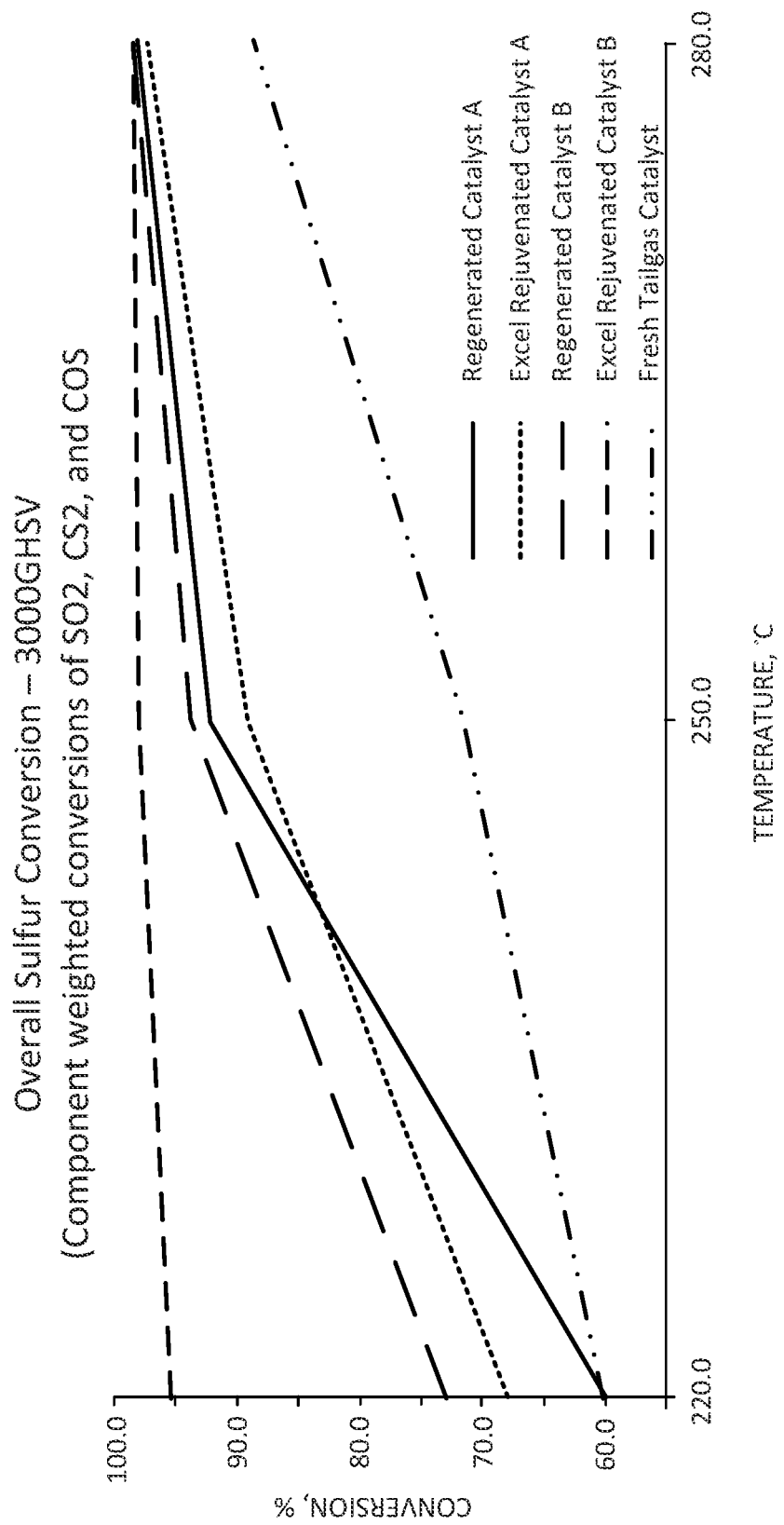
FIG. 9 shows a comparison of overall sulfur conversion at 3000 GHSV using different catalysts.

Overall, the regenerated and rejuvenated hydroprocessing catalysts compare favorably with the fresh tailgas competitive reference catalyst. FIG. 5 and FIG. 9 shows how these catalysts perform with respect to overall sulfur recovery efficiency (SRE, see Equation of FIG. 4) at 3000 GHSV. For the overall sulfur conversion performance, all the regenerated and rejuvenated catalysts that were tested displayed equivalent or better performance than the fresh tailgas competitive reference catalyst. Except for the Regenerated Catalyst A sample at 220° C., the overall picture was one of substantial outperformance compared to fresh tailgas competitive reference catalyst. These "stress test" results further confirm the findings from the realistic 1,200 GHSV testing in Example 1, namely, that regenerated and rejuvenated hydroprocessing catalysts, when applied correctly, can offer an excellent alternative to very well-established tailgas catalyst products in the market such as fresh tailgas competitive reference catalyst.

EXAMPLE 3

Preparation of Regenerated 3.39 wt % Cobalt—16.57 wt % Molybdenum—Balance Alumina Catalyst The following is a preparation procedure for making a catalyst with 3.39 wt. % cobalt (as CoO) and 16.57 wt. % molybdenum (as $MoO_3$), with the balance consisting of primarily alumina ($Al_2O_3$). The source of the cobalt and molybdenum metals came from a spent 2.5 mm trilobe CoMo on alumina hydroprocessing catalyst (See Catalyst C—Application 1 in Table 1) which contained 3.39% cobalt and 16.57% molybdenum as determined by XRF analysis. The hydroprocessing catalyst was regenerated by a regeneration process, as described above in Example 1. In this way, the Regenerated Catalyst C—Application 1 sample which was performance tested under realistic tailgas conditions (see data in Table 2 and 3), was prepared.

While the invention herein disclosed has been described in terms of specific embodiments and applications thereof, numerous modifications and variations could be made thereto by those skilled in the art without departing from the scope of the invention set forth in the claims.

EXAMPLE 4

Preparation of Rejuvenated 3.50 wt % Nickel—15.86 wt % Molybdenum—Balance Alumina Catalyst The following is a preparation procedure for making a catalyst with 3.50 wt. % nickel (as NiO) and 15.86 wt. % molybdenum (as $MoO_3$), with the balance consisting of primarily alumina ($Al_2O_3$). The source of the nickel and molybdenum metals came from a spent 2.5 mm trilobe NiMo on alumina hydroprocessing catalyst which contained 3.50% nickel and 15.86% molybdenum as determined by XRF analysis. The catalyst was prepared by Porocel's Excel® rejuvenation process as described in U.S. Pat. No. 9,895,679. In this way, the Excel® Rejuvenated Commercial Hydroprocessing Catalyst D (2.5 mm trilobe) sample which was performance tested under realistic tailgas conditions (see data in Table 2 and 3), was prepared.

While the invention herein disclosed has been described in terms of specific embodiments and applications thereof, numerous modifications and variations could be made thereto by those skilled in the art without departing from the scope of the invention set forth in the claims.

What is claimed is:

1. A method of forming a reactivated catalyst for a tailgas treating process, the method comprising:
    obtaining a spent catalyst from a hydrotreating process, and
    reactivating the catalyst to form the reactivated catalyst, wherein
    the reactivated catalyst, when contacted with a gas stream comprising one or more sulfur-containing species selected from the group consisting of elemental sulfur (Sx), sulfur dioxide ($SO_2$), carbonyl sulfide (COS), and carbon disulfide ($CS_2$), converts the one or more sulfur-containing species to hydrogen sulfide ($H_2S$) in the presence of hydrogen ($H_2$).

2. The method of claim 1, wherein the hydrotreating process is selected from the group consisting of petroleum hydrotreating processes, hydrodesulfurization (HDS), hydrodenitrogenation (HDN), hydrogenation, hydrodemetallization (HDM), naphtha hydrotreating (NHT), diesel hydrotreating (DHT), kerosene hydrotreating (KHT), jet fuel hydrotreating (JHT), atmospheric gas oil hydrotreating, vacuum gas oil (VGO) hydrotreating, and fluid catalytic cracker (FCC) feed hydrotreating.

3. The method of claim 1, wherein the spent catalyst comprises:
    an inorganic oxide support material having a surface area of 20 to 600 $m^2/g$, one or more Group VIIIB metals, and one or more Group VIB metals supported on the inorganic oxide support material.

4. The method of claim 1, wherein the catalyst comprises cobalt and molybdenum supported on aluminum oxide.

5. The method of claim 1, wherein the catalyst comprises nickel and molybdenum supported on aluminum oxide.

6. The method of claim 1, wherein the reactivating comprises regeneration.

7. The method of claim 6, wherein the regeneration comprises heating the catalyst in an oxygen-containing atmosphere at a temperature of 300 to 500° C. for a time of 30 minutes or more.

8. The method of claim 6, wherein, prior to the regeneration, removing hydrocarbons from the catalyst by solvent extraction or by contacting the catalyst with steam, natural gas combustion products, hydrogen or nitrogen at a temperature of 150 to 550° C.

9. The method of claim 1, wherein the reactivating comprises rejuvenation.

10. The method of claim 9, wherein the rejuvenation comprises impregnating the catalyst with a solution containing a chelating agent and drying the catalyst at a temperature of 50° C. to 300° C.

11. The method of claim 10, wherein the chelating agent is an organic acid.

12. The method of claim 1, further comprising pre-sulfurizing the reactivated catalyst.

13. The method of claim 1, further comprising pre-sulfiding the reactivated catalyst.

14. The method of claim 1, further comprising treating the reactivated catalyst using one or more steps selected from the group consisting of resizing, reshaping, and reformulating the reactivated catalyst.

15. The method of claim 1, further comprising milling the reactivated catalyst to a fine powder and then reforming the reactivated catalyst.

16. The method of claim 15, wherein the spent catalyst, prior to reactivating, has a diameter of 1.3 to 2.5 mm and the reformed reactivated catalyst has a diameter of 3 to 5 mm.

17. The method of claim 1, wherein the spent catalyst, as used in the hydrotreating process, exhibits a pressure drop of 0.20 to 0.80 psi/ft, and wherein the method further comprises treating the reactivated catalyst using one or more steps selected from the group consisting of resizing, reshaping, and reformulating the reactivated catalyst so that the reactivated catalyst exhibits a pressure drop of 0.05 to 0.20 psi/ft, when sock-loaded and tested at 100 ft/min superficial velocity in ambient air.

* * * * *